United States Patent [19]

Morimoto

[11] Patent Number: 5,362,948
[45] Date of Patent: Nov. 8, 1994

[54] FACSIMILE-USE AUTOMATIC ORDER AND SALES MANAGEMENT SYSTEM

[75] Inventor: Kazuo Morimoto, Yokohama, Japan

[73] Assignee: Matsushita Electric Industrial Co., Ltd., Osaka, Japan

[21] Appl. No.: 778,278

[22] Filed: Oct. 17, 1991

[30] Foreign Application Priority Data

Oct. 23, 1990 [JP] Japan ................... 2-285320

[51] Int. Cl.$^5$ .............. G06F 15/46; G06K 15/00; G06K 19/06; G06K 7/10
[52] U.S. Cl. ........................... 235/376; 235/383; 235/385; 235/470; 235/494; 358/408
[58] Field of Search ............... 235/376, 383, 385, 470, 235/494; 358/408, 400, 401; 283/67; 355/14 C

[56] References Cited

U.S. PATENT DOCUMENTS

| | | | |
|---|---|---|---|
| 4,494,862 | 1/1985 | Tanaka | 355/14 C |
| 5,178,417 | 1/1993 | Eshoo | 283/67 |
| 5,227,893 | 7/1993 | Ett | 358/400 |
| 5,235,433 | 8/1993 | Clarkson et al. | 358/400 |
| 5,250,789 | 10/1993 | Johsen | 235/383 |
| 5,265,153 | 11/1993 | Ozawa | 358/401 |
| 5,287,199 | 2/1994 | Zoccolillo | 358/400 |

Primary Examiner—Timothy P. Callahan
Assistant Examiner—Trong Phan
Attorney, Agent, or Firm—Stevens, Davis, Miller & Mosher

[57] ABSTRACT

A management system automatically manages order and sales operations by facsimile communication between an orderer and a supplier. The management method of this system comprises checking the steps of the kind and number of commodities written on an order sheet which is sent from the orderer by facsimile, checking the stock of such commodities, sending an order content check request sheet to the orderer by facsimile in order to have the orderer check the contents of the order, collecting the ordered commodities based on an order content confirmation sheet sent from the orderer by facsimile, managing the remaining stock of the commodities, and performing accounting operations for the ordered commodities.

8 Claims, 8 Drawing Sheets

FIG.2

0451234567 | HOME DELIVERY ORDER SHEET — 100

8 — barcode; 9 — barcode with ①

SMEAR FIGURE IN UPPER RIGHT BAR CODE IF DELIVERY DATE AND HOUR ARE INSTRCTED

CUSTOMER'S ADDRESS ●○◇◆□■△▲ CUSTOMER'S NO. = 35402484249

△▲▽▼✹☆★○●○◇◆

CUSTOMER'S NAME ○△▽■▲

10 — barcode

TELEPHONE NO. 06-123-4567

PAYMENT AUTOMATIC PAYMENT — 13 (barcode with ①)

ORDER COMMODITY LABEL MOUNT SPACE — 11

ORDER COMMODITY LABEL MOUNT SPACE — 11

ORDER COMMODITY LABEL MOUNT SPACE — 11

CHECK EITHER FIGURE BELOW BY SMEARING IT WITH PENCIL
DISTINGUISH FINAL PAGE OR ADDITIONAL PAGE PRESENT

FINAL PAGE — 12 (barcode with ①)   ADDITIONAL PAGE PRESENT — 12 (barcode with ②)

DELIVERY REQUEST ORDER SHEET

CUSTOMER'S ADDRESS ●○◇◆□■△▲ CUSTOMER'S NO. 35402484249

△▲▽▼✳☆★○●○◇◆ — 10

CUSTOMER'S NAME ○△▽■▲

TELEPHONE NO. 06-123-4567 — 13

ENTER DESTINATION, ADDRESS, NAME TELEPHONE NO. IN THE FOLLOWING FIELD

ADDRESS

NAME

TELEPHONE NO. — 15

SELECT REQUESTED DELIVER DATE BY MARKING METHOD AND ENTER MONTH AND DATE IN THE RIGHT FIELDS.

1 2 3 4 5 6 7 8 9 10 11 12 — 16

| 1 | 2 | 3 | 4 | 5 | 6 | 7 | 8 | 9 | 10 | 11 | 12 |

ENTER MONTH — 17

| 1 | 2 | 3 | | x10 | | | 0 | | | | |

ENTER DATE

| 1 | 2 | 3 | 4 | 5 | 6 | 7 | 8 | 9 | 0 | x1 |

ORDER COMMODITY LABEL MOUNT SPACE — 11

CHECK EITHER FIGURE BELOW BY SMEARING IT WITH PENCIL TO DISTINGUISH FINAL PAGE OR ADDITIONAL PAGE PRESENT

FINAL PAGE ① — 12        ADDITIONAL PAGE PRESENT ② — 12

FIG. 4

300 ORDER COMMODITY LABEL

COMMODITY NAME, NO., RATING, SIZE, ETC.

9 8 7 6 5 4 3 2 1 0 — 18

NO. OF COMMODITY ORDERED

| 9 | 8 | 7 | 6 | 5 | 4 | 3 | 2 | 1 | 0 | ×10 |
| 9 | 8 | 7 | 6 | 5 | 4 | 3 | 2 | 1 | 0 | ×1 |

19

ENTER FIGURES — 20

FIG.5

ORDERE CONTENT CHECK REQUEST SHEET

0455443468

RECEIVED AT 11:00 A.M. ON FEBRUARY 15, 1990
CORRECT ERROR IN THE FOLLOWING ITEMS IF NECESSARY

CUSTOMER'S ADDRESS ●○◇◆□■△▲ CUSTOMER'S NO.= 35402484249
△▲▽▼✳︎☆★○●○◇◆

CUSTOMER'S NAME ○△▽■▲

TELEPHONE NO. 06-123-4567

CORRECTION CHECK FIELD
① ② ③ ④

PAYMENT METHOD — AUTOMATIC PAYMENT·CASH
COMMODITY DELIVERY METHOD — GIFT DELIVERY·HOME DELIVERY·EX STORE
DELIVERY DATE AND HOUR — AROUND 4:00 P.M. TODAY (PREFERABLY 2:00 P.M.)
PRESENTATION OF ALTERNATE COMMODITY DUE TO SHORTAGE — YES OR NOT

ALTERNATIVE

| | COMMODITY NO. | | QUANTITY | PRICE (YEN) |
|---|---|---|---|---|
| ① | 1234567890 | CHINESE CABBAGE 1/4 | 1 | 128 |
| ② | 2345678901 | SHIITAKE | 2 | 346 |
| ③ | 3456789012 | ENOKITAKE | 1 | 88 |
| ④ | 4567890123 | JAPANESE RADISH | 1 | 240 |
| ⑤ | 5678901234 | TOFU | 2 | 380 |
| ⑥ | 6789012345 | CHICKEN 200g | 1 | 240 |
| ⑦ | 7890123456 | SHUNGIKU | 1 | 180 |
| ⑧ ★ | 8901234567 | SPORTS SHOES | 1 | 860 |
| ⑨ | 9012345678 | UMBRELLA | 1 | 1980 |
| | | DELIVERY FEE | 1 | 200 |

TOTAL (CONSUMPTION-TAX EXCLUDED) 4642
TOTAL (3% CONSUMPTION TAX INCLUDED) 4781

FIG.6

```
0455311231    ORDERE CONTENT CONFIRMATION
              SHEET
CUSTOMER'S    ●○◇◆□■△▲    CUSTOMER'S NO.= 35402484249
ADDRESS
              △▲▽▼✹☆★○●○◇◆
CUSTOMER'S    ○△▽■▲
NAME
TELEPHONE NO. 06-123-4567

CONFIRMATION
CHECK FIELD

①    CONFIRMED THAT ORDERED CONTENTS ARE RIGHT
  ②    SEND BROCHURE TO CONFIRM ALTERNATIVE COMMODITY
  ③    CURRENT ORDER IS CANCELLED DUE TO CORRECTION, ELIMINA-
        TION, AND/OR ADDITION, AND NEW ORDER WILL BE MADE
  ④    OTHERS (SEE FOLLOWING FREE DESCRIPTION FIELD)

FREE DESCRIPTION FIELD
```

FACSIMILE-USE AUTOMATIC ORDER AND SALES MANAGEMENT SYSTEM

BACKGROUND OF THE INVENTION

1. Field of the Invention

The present invention relates to an automatic order and sales management system using a facsimile which promotes automation of order receiving operations of a supplier, and automation and streamlining of all sales based on information on the automation of the order receiving operations between an ordinary home and a supermarket, a retail store and a wholesale store, a wholesale store and a manufacturer, or an ordinary home and a mail-order dealer, and which realizes a service in which a consumer can purchase commodities sold at a supermarket at home.

2. Description of the Related Art

In this kind of system, the consumer generally purchases goods by using a telephone or mail, or directly going to a store. A facsimile is used instead of the mail to send only an order slip for purchasing goods, which can save time.

On the other hand, although the automation of order placing and receiving operations of traders is sometimes realized by an on-line system for communication between a private terminal installed at an supplier's office and a central computer at an order's office, such a system has not come into wide-spread use yet.

It is necessary in the above on-line system for communication between the private terminal and the central computer to install a terminal at the office of the orderer. In particular, if the orderer is an ordinary family, use of such an on-line communication system is unlikely to be wide-spread among them. Even if communication with the computer of the supplier by personal computer is made possible due to an increase in the popularity of using a personal computer as a substitute for the private terminal, there are problems in manuplatability and the method for inputting an order of the personal computer, and thus it is difficult to popularize such personal computer communication.

SUMMARY OF THE INVENTION

It is the aim of the present invention to solve the above problems of the conventional art. It is, therefore, an object of the present invention to provide a facsimile-use automatic order and sales management system which can automatically perform order management operations of a supplier by performing facsimile communication with an orderer in a predetermined manner if the orderer has a general facsimile device.

In order to achieve the above object, according to the present invention, there is provided a facsimile-use automatic order and sales management method comprising the steps of checking the kind and number of commodities written on an order sheet which is sent from an orderer by facsimile, checking the stock of such commodities, sending an order content check request sheet to the orderer by facsimile in order to have the orderer check the contents of the order, collecting the ordered commodities based on an order content confirmation sheet sent from the orderer by facsimile, managing the remaining stock of the commodities, and performing accounting operations.

Therefore, according to the present invention, it is possible to save the orderer troublesome go-shopping since commodities are packed and delivered to the orderer's home, thereby saving shopping time. A store which receives an order has an advantage in that automation and streamlining of all sales is realized by automating the order receiving operations and using information on the automation of the order receiving operations, and individual care of customers is made possible.

BRIEF DESCRIPTION OF THE DRAWINGS

FIG. 2 is a view illustrating a home delivery order sheet;

FIG. 3 is a view illustrating a delivery request order sheet;

FIG. 4 is a view illustrating an order commodity label;

FIG. 5 is a view illustrating an order content check request sheet;

FIG. 6 is a view illustrating an order content confirmation sheet;

DESCRIPTION OF THE PREFERRED EMBODIMENT

Figure 1:
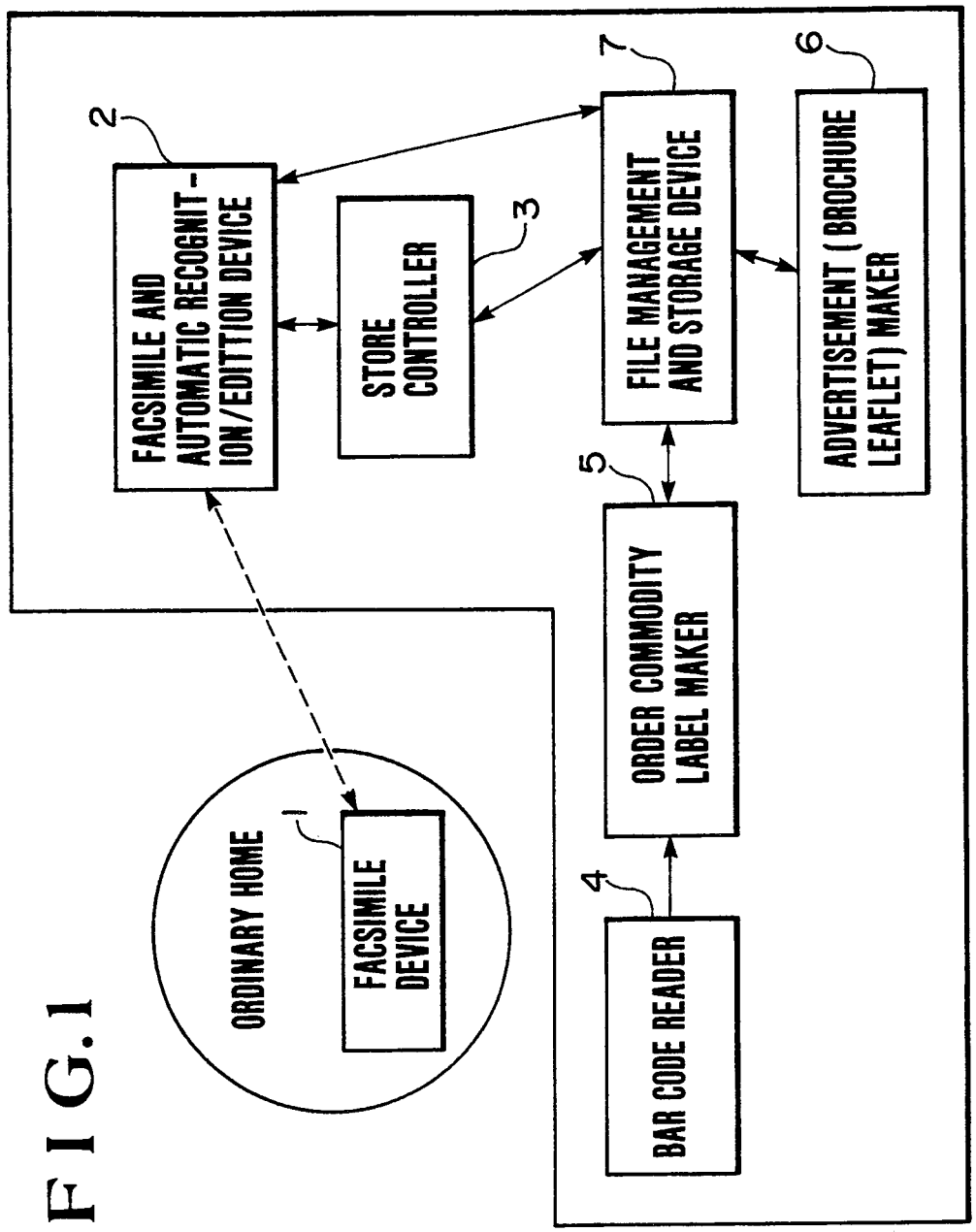
FIG. 1 is a block diagram showing the configuration of a facsimile-use automatic order and sales management system for communication between an ordinary home and a supermarket according to an embodiment of the present invention.

FIG. 1 shows the configuration of a facsimile-use automatic order and sales management system for communication between an ordinary home and a supermarket according to an embodiment of the present invention.

Referring to FIG. 1, the management system is constituted by a facsimile device 1 at the ordinary home, a facsimile and automatic recognition/edition device 2 at the supermarket, a store controller 3 for controlling all sales of the supermarket, a bar code reader 4 for reading bar codes of commodities, an order commodity label maker 5, an advertisement maker 6 for making advertisements, such as brochure and leaflets, and a common file management and storage device 7.

The facsimile and automatic recognition/edition device 2 is provided with a facsimile device, a device for detecting the positions of a bar code and a mark sheet and automatically recognizing the contents of the bar code and the mark sheet, a device for filling out a sheet in a predetermined format and printing, and so on. The store controller 3 has various kinds of functions 25 to 37 shown in FIG. 7, and includes a general control unit 38 for controlling these functions. The bar code reader 4 can recognize the JAN code, or the like standardized as a production code. The order commodity label maker 5 produces order commodity labels shown in FIG. 4 for commodities based on bar codes read by the bar code reader 4, the file management and storage device 7 stores these labels as data, and the advertisement (brochure-leaflet) maker 6 prints the data on brochure or leaflets to be distributed to homes.

FIG. 2 is a home delivery order sheet 100 used in the case that the orderer requests the delivery of commodities to his house. A bar code 8 indicates that this sheet is the home delivery request sheet 100. If the orderer goes to the supermarket to receive the commodities he ordered, he uses an unillustrated packaging request order sheet whose format is the same as that of the home delivery order sheet 100 except for the bar code 8 shown in FIG. 2. A bar code 9 is marked by smearing a square between bar codes (a portion in which a circle is put around the numeral) with black only when the orderer designates a desired date of delivery, and such a bar code is referred to as a marking bar code hereinafter. The date of delivery is designated on another delivery date designation sheet in the same marking bar code method. A bar code 10 represents the customer number of the orderer if the name of the orderer is registered. An order commodity label 300 shown in FIG. 4 is stuck to a label mount space 11. A marking bar code 12 is marked to show whether or not this sheet is the last page of order sheets. An automatic payment marking bar code 13 is smeared over by a pencil if the bill of order is not paid in cash, but is automatically paid from the registered bank account of the orderer.

FIG. 3 shows a delivery request order sheet 200 used in the case in which the orderer requests the supermarket to directly deliver a commodity as a gift to the other. A bar code 14 indicates that this sheet is the delivery request order sheet 200. The address, name and telephone number of the addressee are written in an addressee entry space 15. Numeral squares corresponding to a designated delivery date of a delivery date designation marking bar code 16 are smeared over by a pencil, and numerals representing the desired delivery date are put in a numeral entry field 17.

FIG. 4 shows an example of the order commodity label 300 which is separated from the brochure or the like and stuck onto the order commodity label mount space 11 shown in FIG. 2 or 3. Numerals 18, 19 and 20 denote an order commodity bar code, a number designation marking bar code, and a number entry space in which the maximum number to be designated is 99 in this embodiment.

FIG. 5 shows an order content check request sheet 400. A bar code 21 indicates that this sheet is the order content check request sheet 400. Numeral 22 denotes a marking bar code in an order content check field to be checked when the contents of the sheet 400 are different from the contents of the order.

In this order content check field 22, for example, if the payment method is corrected or changed from "AUTOMATIC PAYMENT CASH" to—IN CASH—, a square corresponding to "PAYMENT" is smeared over with black and the characters "AUTOMATIC PAYMENT CASH" on the right of the square are crossed with a double line. The space "COMMODITY DELIVERY METHOD" is similarly corrected. As for the field "DELIVERY DATE AND HOUR", a desired delivery date is put therein. In the case of the space "PRESENTATION OF ALTERNATE COMMODITY DUE TO SHORTAGE", since the supplier checks the stock of ordered commodities beforehand and marks the commodity out of stock with * ("SPORT SHOES" as shown in FIG. 5), if the orderer needs a substitute for the commodity, he selects "YES", and smears a square corresponding to the commodity in the correction check field 22.

FIG. 6 shows an order content confirmation sheet 500. Numerals 23 and 24 denote a bar code 23 for indicating that this sheet is the order content confirmation sheet 500, and an order content confirmation check field, respectively.

In the order content confirmation check field 24, "CONFIRMED THAT ORDERED CONTENTS ARE RIGHT", "SEND BROCHURE TO CONFIRM ALTERNATIVE COMMODITY", "CURRENT ORDER IS CANCELLED DUE TO CORRECTION, AND/OR ADDITION AND NEW ORDER WILL BE MADE", "OTHERS (SEE FOLLOWING FREE DESCRIPTION FIELD), and so on are checked.

Figure 7:
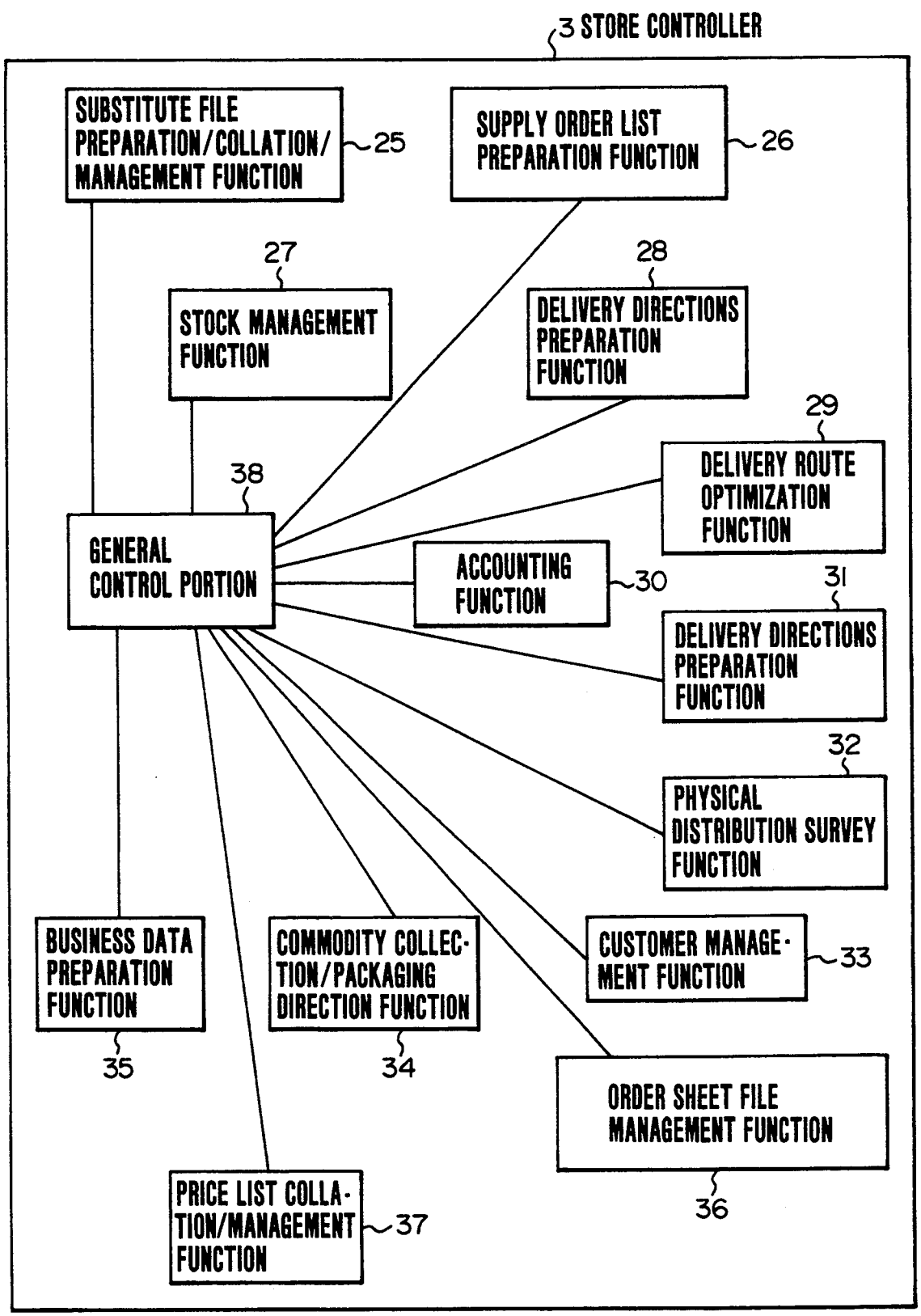
FIG. 7 is a functional block diagram illustrating a store controller shown in FIG. 1.

FIG. 7 is a functional block diagram of the store controller 3 shown in FIG. 1. The store controller 3 uses the general control portion 38 as the center of control operations, and has various kinds of functions 25 to 37 as follows: a substitute file preparation/collation/management function 25, a supply order list preparation function 26, a stock management function 27, a delivery directions preparation function 28, a delivery route optimization function 29, an accounting function 30, a delivery directions preparation function 31, a physical distribution survey function 32, a customer management function 33, a commodity collection/packaging direction function 34, a business data preparation function 35, an order sheet file management function 36, and a price list collation/management function 37.

Figure 8:
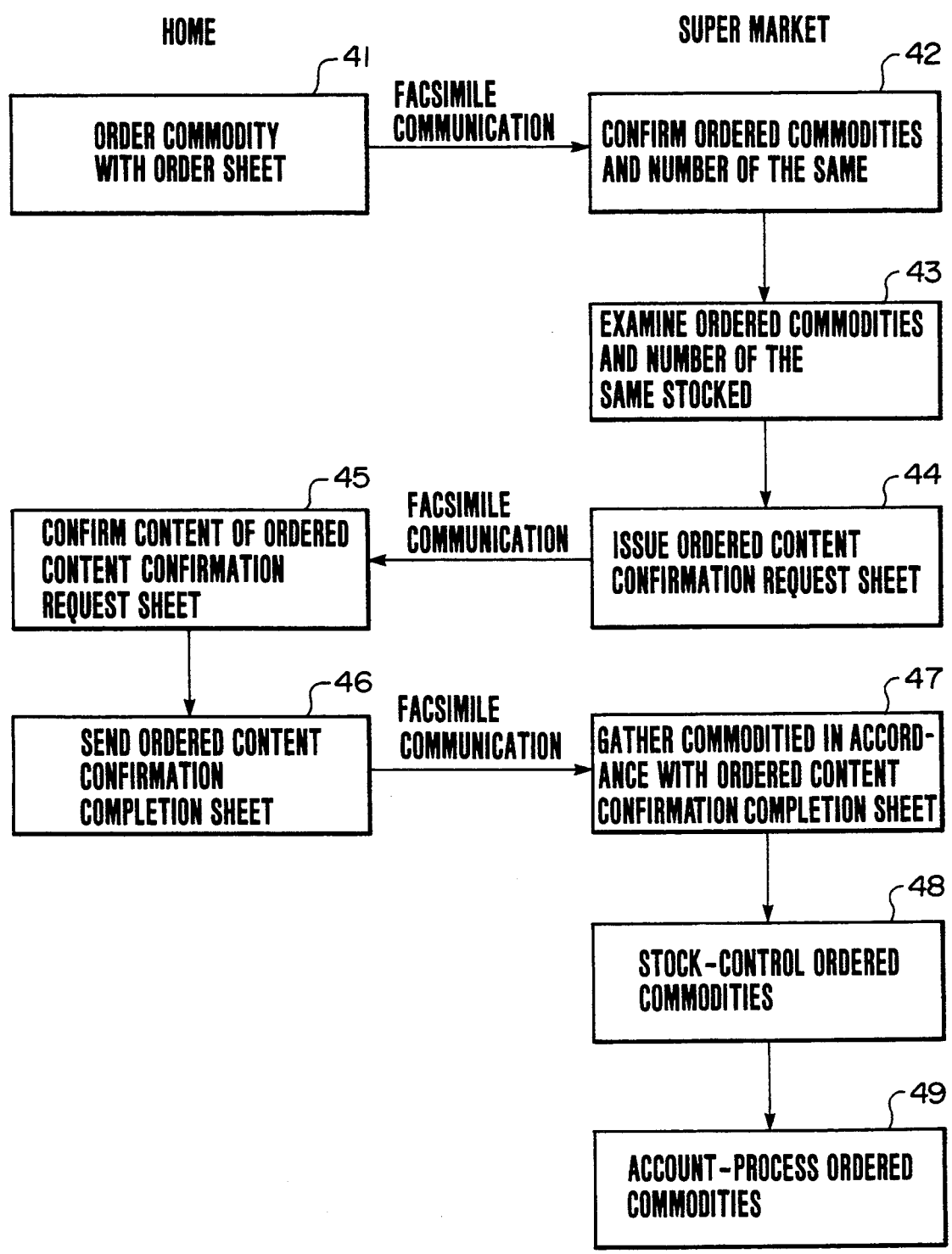
FIG. 8 is an operational process chart showing basic operations of the present invention.

The basic operations of the above embodiment will now be described with reference to the operational process chart shown in FIG. 8. On the side of home, commodities are ordered by sending the home delivery order sheet 100 or the delivery request order sheet 200 by facsimile (Step 41). The supermarket which receives the order confirms the kind and number of the ordered commodities written on the order sheet (Step 42). Subsequently, the stock of the ordered commodities is checked (Step 43), and the order content check request sheet 400 containing the check result is prepared and sent to the home by facsimile (Step 44). The home confirms the contents of the received order content confirmation request sheet 400 (Step 45) and sends the order content confirmation sheet 500 to the supermarket by facsimile (Step 46). The supermarket collects the ordered commodities according to the contents of the received order content confirmation sheet 500 (Step 47), manages the remaining stock of the ordered commodities, for example, resupplies new commodities (Step 48), and performs accounting operations of the commodities, such as issue of a bill and a sales slip, and procedures of automatic payment from the orderer's bank account (Step 49).

The operations of the above embodiment will be described more specifically. For example, an orderer in an ordinary home purchases ingredients for today's supper, daily necessities and so on from the supermarket shown in FIG. 1 where the name of the orderer is registered. It is assumed that the orderer requests to deliverer ordered commodities at home at 2:00 P.M. and to pay the charge of the commodities in cash on delivery.

In this case, the orderer sticks order commodity labels 300 shown in FIG. 4 of commodities to be ordered onto the home delivery order sheet 100 shown in FIG. 2 which he received from the supermarket at the registration, fills out the order sheet 100, and sends the sheet 100 to the supermarket by facsimile.

The order commodity label 300 printed on a catalogue or a leaflet is cut off, or a copy thereof is cut off, and stuck onto the order commodity label mount space 11 of the home delivery order sheet 100.

In the case of an order of the same commodities as he has already purchased at the supermarket, if the orderer has gotten order commodity labels of the commodities at the time of previous purchase, he can use the labels.

If he is going to make a dish made from the same ingredients as he ordered before, he can use the home delivery order sheet 100 which he has used before.

The number of orders must be written on the marking bar code 19 and the order number entry space 20 of the order commodity label 300. In the case of the marking bar code 19, one of squares corresponding to the numeral in the second digit of the number and one of squares corresponding to the numerals in the first digit are smeared over with black. In the case of the order number entry space 20, the number of orders is written in Arabic numerals.

It is also necessary to fill the marking bar codes 9 and 12 of the home delivery order sheet 100. When the orderer requests the delivery at 2:00 P.M., the center square of the marking bar code 9 between bar codes is smeared over with black. In this case, it is necessary to enter 2:00 P.M." in another delivery date designation sheet by the marking bar code method, and to send the delivery date designation sheet together with the order sheet 100 by the facsimile device 1. If the number of the order commodity labels 300 is large, since a plurality of order sheets 100 are necessary, the right bar codes of the order sheets 100 other than the last order sheet 100 are smeared and the left bar code of the last order sheet 100 is smeared. Since the bill is paid in cash, nothing is made in the marking bar code 13.

When the facsimile and automatic recognition/edition device 2 at the supermarket receives the order sheet 100, it automatically recognizes the bar codes on the order commodity labels 300 and the marking bar codes on the order sheet 100, grasps the contents of the order, prepares the order content check request sheet 400 shown in FIG. 5 while exchanging information with the store controller 3, and sends the order content check request sheet 400 to the facsimile device 1 at the orderer's home.

The orderer checks the contents of the received order content check request sheet 400. If the contents of the sheet 400 are different from the order contents, the orderer smears a square corresponding to the difference in the correction check field 22 to correct the contents, and sends the sheet 400 to the facsimile and automatic recognition/edition device 2 of the supermarket, or sticks correct order commodity labels onto another order content correction sheet and sends the correction sheet by facsimile. If the contents of the order content check request sheet 400 are correct, applicable squares of the confirmation check field 24 on the order content confirmation sheet 500 shown in FIG. 6 are marked, and the order content confirmation sheet 500 is sent to the facsimile and automatic recognition/edition device 2 of the supermarket.

When the supermarket receives the corrected order content check request sheet 400 shown in FIG. 5, it corrects the wrong portions, prepares and sends a new order content check request sheet to the home. Only when the supermarket receives the order content confirmation sheet 500 shown in FIG. 6 and the marking bar code of "CONFIRMED THAT ORDER CONTENTS ARE RIGHT" is marked, the ordering operation is completed.

Referring to FIG. 5, the sports shoes designated by the order commodity label are out of stock, and sports shoes on the order content check request sheet 400 are substitutes which are found by the supermarket judging from data in a customer file on former purchases and the members of family of the orderer. Therefore, a mark (*) representing a substitute is added. The orderer refers to the catalogue for the commodity number of the substitute written on the order content check request sheet 400. If the orderer do not have the catalogue at hand, he can ask the supermarket on the order content confirmation sheet 500 to send a copy of the catalogue by facsimile. If the orderer orders a commodity which is not written in a general catalogue or a new commodity, the confirmation efficiency of the substitute can be enhanced by sending an order commodity change sheet including the description of the substitute together with the order content check request sheet 400 to the home.

If the commodity is ordered by facsimile by using an unillustrated packaging request order sheet without using the home delivery order sheet 100, the orderer can receive and check the commodity at the supermarket. Accordingly, it is unnecessary for the orderer to stand in a queue at the check-counter of the supermarket, thus saving shopping time.

In order to order a commodity as a gift, it is necessary to enter the address, name and phone number of the addressee in the addressee entry space 15 of the delivery request order sheet 200 shown in FIG. 3, enter the desired delivery date in the marking bar code 16 and the numeral entry space 17, and send this sheet 200 to the supermarket by facsimile.

When the supermarket receives the order content confirmation sheet 500 shown in FIG. 6 and the ordering operation is completed, the store controller 3 shown in FIG. 1 centrally operates and the commodity collection/packaging direction function 34 shown in FIG. 7 outputs a list of commodities to be collected with information on storage portions (shelf number) of the commodities. An automatic collection/packaging device provided with a robot collects and packages the commodities, and sticks bills issued by the accounting function 30 onto the packaged commodities. If the charge is automatically paid from the bank account of the orderer, the accounting function 30 executes the firm banking process to the financial institution.

The stock management function 27 checks the kind and number of the ordered commodities read from the order commodity labels 300, and the substitute file preparation/collation/management function 25 finds a substitute for a commodity out of stock among the ordered commodities when it is judged that much time is not left to the desired delivery date. A there is left much time before a gift or the like is delivered, or if the commodity is periodically delivered, the delivery date is confirmed by utilizing the automatic order system for communication with the manufacturer and the wholesale store and used as information to judge the commodity delivery date to be written on the order content check request sheet 400.

The supply order list preparation function 26 automatically prepares an order list in order to replenish stocks in accordance with the number of sold commodities, and automatically places orders to some suppliers.

The order directions preparation function 28 cuts off a portion of the addressee entry field 15 of the delivery request order sheet 200 where the address of the addressee and so on are written, and sticks the portion onto delivery directions.

The delivery directions preparation function 31 makes delivery instructions for the delivery to adjacent homes, the delivery route optimization function 29 sets the optimum delivery route, and the physical distribution survey function 32 surveys the distribution of commodities.

The customer management function 33 manages information on customers whose names are registered, and the order sheet file management function 36 manages order sheet files which are classified by customer, purchase date and kind of the commodity.

The price list collation/management function 37 collates price lists of commodity bar codes and the order delivery bar codes on the order commodity labels.

The business data preparation function 35 is connected to an accounting information terminal to collect business data on sales, stocking, profit and so As described in the above embodiment, the present invention has the following advantages.

(1) Even if the orderer is an ordinary family, this system is realized if the orderer has only a facsimile device.

(2) The orderer can order a commodity while confirming the kind and delivery date of the commodity in a simple procedure.

(3) If the delivery service is available as in the above embodiment, the orderer can be saved the troublesome, shopping at the store for commodities. Furthermore, even if the orderer cannot come out, he can purchase commodities as usual.

(4) The orderer orders commodities which are almost the same as those he purchased before by a simple operation of partially changing order commodity labels on the order sheets and the number of the ordered commodities which he used before.

(5) If the orderer had gotten an order commodity label of a commodity which he purchased at a store, since he knows the content and quality of the commodity, he can purchase the commodity again without any worry, and be saved the troublesome looking for a label of the commodity in a catalogue.

(6) It is possible to fully automate order receiving operations of the store with some exceptions.

(7) The store can given good service to the customer, and furthermore, carefully manage stocking, shipment, collection of money, commodities and money.

(8) The store can be more often saved from the troublesome displaying of commodities directly sent from the manufacturer and the factory in the shop window and sticking of price labels onto the commodities.

(9) It is made possible for an automatic reader to reliably read order sheets at high speed by utilizing bar codes and marking bar codes on an order sheet.

(10) Even if the orderer goes to the store, if he orders commodities by facsimile beforehand, he has only to receive the ordered commodities at the check-out counter, thereby saving shopping time. Furthermore, the congestion at the check-out counter, the store, the parking lot and so on can be relieved.

What is claimed is:

1. A facsimile-use automatic order and sales management method, comprising the steps of:
   providing an order sheet for receiving automatically recognizable markings to convey information;
   receiving by a facsimile means a facsimile of said order sheet from an orderer;
   recognizing by automatic means said information on said order sheet to determine a kind and number of commodities written on said order sheet;
   checking a stock of said commodities;
   generating by automatic means an order content check request sheet;
   transmitting said order content check requires sheet to said orderer by a facsimile means in order to have said orderer check the order;
   receiving by a facsimile means an order content confirmation sheet by said orderer;
   recognizing by automatic means information on said order content confirmation sheet;
   collecting said ordered commodities based on said order content confirmation sheet;
   managing remaining stock of said ordered commodities; and
   performing accounting operations for said ordered commodities.

2. A facsimile-use automatic order and sales management method according to claim 1, further comprising the step of controlling the delivery schedule so that said commodities can be delivered at a data nd time which said orderer desires.

3. A facsimile-use automatic order and sales management method according to claim 1, still further comprising the step of finding a substitute for a commodity out of stock among said ordered commodities.

4. A facsimile-use automatic order and sales management method according to claim 1, further comprising the step of providing automatically recognizable indicia on said order sheet, said indicia being capable of being marked by said orderer to select a payment method for the order.

5. A facsimile-use automatic order and sales management system according to claim 1, wherein at least some of said automatically recognizable markings comprise pre-printed forms for attachment to said order sheet.

6. A facsimile-use automatic order and sales management system, comprising:
   means, including facsimile devices installed at an orderer and a supplier, for transmitting an order sheet sent from said orderer by facsimile, receiving said order sheet at said supplier, detecting positions of codes representing order contents of an order written on said order sheet, and automatically recognizing the order contents;
   means for understanding the recognized order contents and automatically checking a stock of ordered commodities designated by said order contents;
   means for generating an order content check request sheet and sending said order content check request sheet to said ordered by facsimile;
   means for automatically collecting commodities indicated on an order content confirmation sheet sent from said orderer by fascimile;
   means for automatically managing a remaining stock; and
   means for automatically performing accounting operations for said order.

7. A facsimile-use automatic order and sales management system according to claim 6, wherein said codes comprise a bar code and a marking code.

8. A facsimile-use automatic order and sales management system according to claim 6, further comprising means for printing at least some of said codes for attachment to said order sheet.

* * * * *